(12) United States Patent
Quesada Saborio

(10) Patent No.: US 9,316,327 B1
(45) Date of Patent: Apr. 19, 2016

(54) REFRIGERANT CONTROL VALVES

(71) Applicant: Carlos Quesada Saborio, San José (CR)

(72) Inventor: Carlos Quesada Saborio, San José (CR)

(*) Notice: Subject to any disclaimer, the term of this patent is extended or adjusted under 35 U.S.C. 154(b) by 279 days.

(21) Appl. No.: 13/898,266

(22) Filed: May 20, 2013

Related U.S. Application Data

(63) Continuation of application No. 12/924,702, filed on Oct. 1, 2010, now Pat. No. 8,443,838.

(60) Provisional application No. 61/277,988, filed on Oct. 1, 2009, provisional application No. 61/278,269, filed on Oct. 5, 2009, provisional application No. 61/278,503, filed on Oct. 7, 2009.

(51) Int. Cl.
*F16K 31/04* (2006.01)

(52) U.S. Cl.
CPC .................................. *F16K 31/04* (2013.01)

(58) Field of Classification Search
CPC .................... F16K 1/52; F16K 31/04
See application file for complete search history.

(56) References Cited

U.S. PATENT DOCUMENTS

| | | | |
|---|---|---|---|
| 4,349,489 A | | 9/1982 | Gaget |
| 4,397,331 A | | 8/1983 | Medlar |
| 4,407,327 A | * | 10/1983 | Hanson et al. ............. 137/625.3 |
| 4,860,993 A | | 8/1989 | Goode |
| 5,419,531 A | * | 5/1995 | Hoehn ......................... 251/122 |
| 6,250,602 B1 | | 6/2001 | Jansen |
| 6,637,452 B1 | | 10/2003 | Alman |
| 6,848,670 B2 | | 2/2005 | Haunhorst |
| 7,448,409 B2 | | 11/2008 | Micheel |

* cited by examiner

*Primary Examiner* — Eric Keasel
(74) *Attorney, Agent, or Firm* — James Creighton Wray; Meera P. Narasimhan

(57) ABSTRACT

A refrigerant valve has a body with a through bore. Multiple tubes have openings aligned in a ring around a middle of the bore. The tubes lead to larger channels in the body. A needle assembly inserted through an end of the bore reciprocates a needle with a stepper motor and speed reducer to precisely control sizes of the openings. Further advancing the needle shaft after closing the openings to the tubes, engages and slides a bypass sleeve against a return spring force to open a bypass in a side of the valve body. A connector connects the bypass in a first end of the bore to outward opening holes of the channels.

15 Claims, 23 Drawing Sheets

REFRIGERANT CONTROL VALVES

This application is a continuation of application Ser. No. 12/924,702 filed Oct. 1, 2010, which claims the benefit of U.S. Provisional Applications 61/277,988, filed Oct. 1, 2009, 61/278,269, filed Oct. 1, 2009 and 61/278,503, filed Oct. 7, 2009, which are hereby incorporated by reference in their entireties.

SUMMARY OF THE INVENTION

A refrigerant control valve has a valve body and a through bore in the valve body. The through bore has a first end portion, a medial portion and a second end portion. Plural tubes having first and second ends extend through the valve body. Plural lateral openings in the medial portion of the through bore are connected to the first ends of the tubes. Plural channels having first and second ends extend through the valve body. The first ends of the plural channels are connected respectively to the second ends of the plural tubes.

A needle assembly is mounted in the second end of the through bore. The needle assembly has a needle shaft with first and second ends and an end needle on the first end of the needle shaft.

A longitudinal needle motion controller is connected to the second end of the needle shaft and is disposed with the needle assembly to move the needle shaft in the through bore and to move the end needle in the through bore to selectively partially open, open, partially close, close and obscure the lateral openings and to control refrigerant flowing between from them the first end of the through bore and the plural channels.

The valve body has an axis, a first end a second end first end portion, a medial portion and a second end portion, wherein the first end portion is generally cylindrical and the medial and second end portions are generally conical and funnel shaped and extend radially outward from the axis with increasing diameters of the medial and second end portions.

The plural tubes and the plural channels are arranged at acute angles with respect to the through bore and extend through the medial and second end portions.

A cap is fitted on the second end of the valve body. A sealing ring is inserted between the cap and the second end of the valve body, and fasteners connected to the cap and the second end of the valve body, compressing the sealing ring between the cap and the second end of the valve body.

The valve body has an annular second end surface, and the annular end surface has plural spaced connection openings at the second ends of the plural channels.

The connection openings have recesses in the second end of the valve body. Connection tubes are inserted and sealed in the recesses.

The medial portion of the through bore is a needle chamber, wherein the needle shaft slides.

The second end of the needle shaft is connected to a threaded shaft, and the threaded shaft is connected to a complementary threaded sleeve. The needle motion controller is connected to the complementary threaded sleeve to turn the sleeve in a first direction to advance the needle shaft in the needle chamber. Turning the sleeve in a second opposite direction moves the needle shaft in an opposite direction.

One needle motion controller further includes a stepper motor and a speed reducer. An output on the speed reducer is connected to the threaded sleeve to rotate the sleeve selectively in smooth small increments in the first and second directions.

In one embodiment, the second end of the needle shaft has a recess that receives the threaded shaft. A speed reducer is positioned in a first recess extends into the second end of the valve body. A second smaller recess extends into the second portion of the valve body. A rotary to linear converter is positioned in the first and second recesses. A stepper motor is connected to the speed reducer and needle assembly. A cap covers the stepper motor and holds the stepper motor toward the speed reducer and needle assembly. A sealing ring is interposed between the cap and the second end of the valve body, and fasteners connect the cap to the second end of the valve body and compress the sealing ring.

In one embodiment, a large bypass hole extends through a wall of the first portion of the valve body. Plural holes extend outward from first ends of the plural channels through a wall of the medial portion of the valve body. A bypass cover having a central first end opening is fitted over the first portion and partially over the medial portion of the valve body. A fluid connection is connected to the cover for connecting the bypass hole in the first portion of the valve body to the plural outward extending holes from the first ends of the plural channels. An annular cylindrical sleeve having open first and second ends is slideable within the through bore. The sleeve has a lateral hole for selectively aligning with the bypass hole. A sleeve travel limiter is adapted to permit movement of the sleeve between a first position aligning the sleeve lateral hole with the bypass hole and a second position closing the bypass hole with a wall of the sleeve. A spring interposed between the first end of the cover and a first end of the sleeve urges the sleeve into its second position closing the bypass hole. Advancing the needle shaft toward the first end of the through bore closes the lateral openings to the tubes and moves the sleeve against force of the spring into the first position of the sleeve, aligning the lateral hole in the sleeve with the bypass hole.

These and further and other objects and features of the invention are apparent in the disclosure, which includes the above and ongoing written specification, with the claims and the drawings.

DETAILED DESCRIPTION OF THE DRAWINGS

Figure 1:
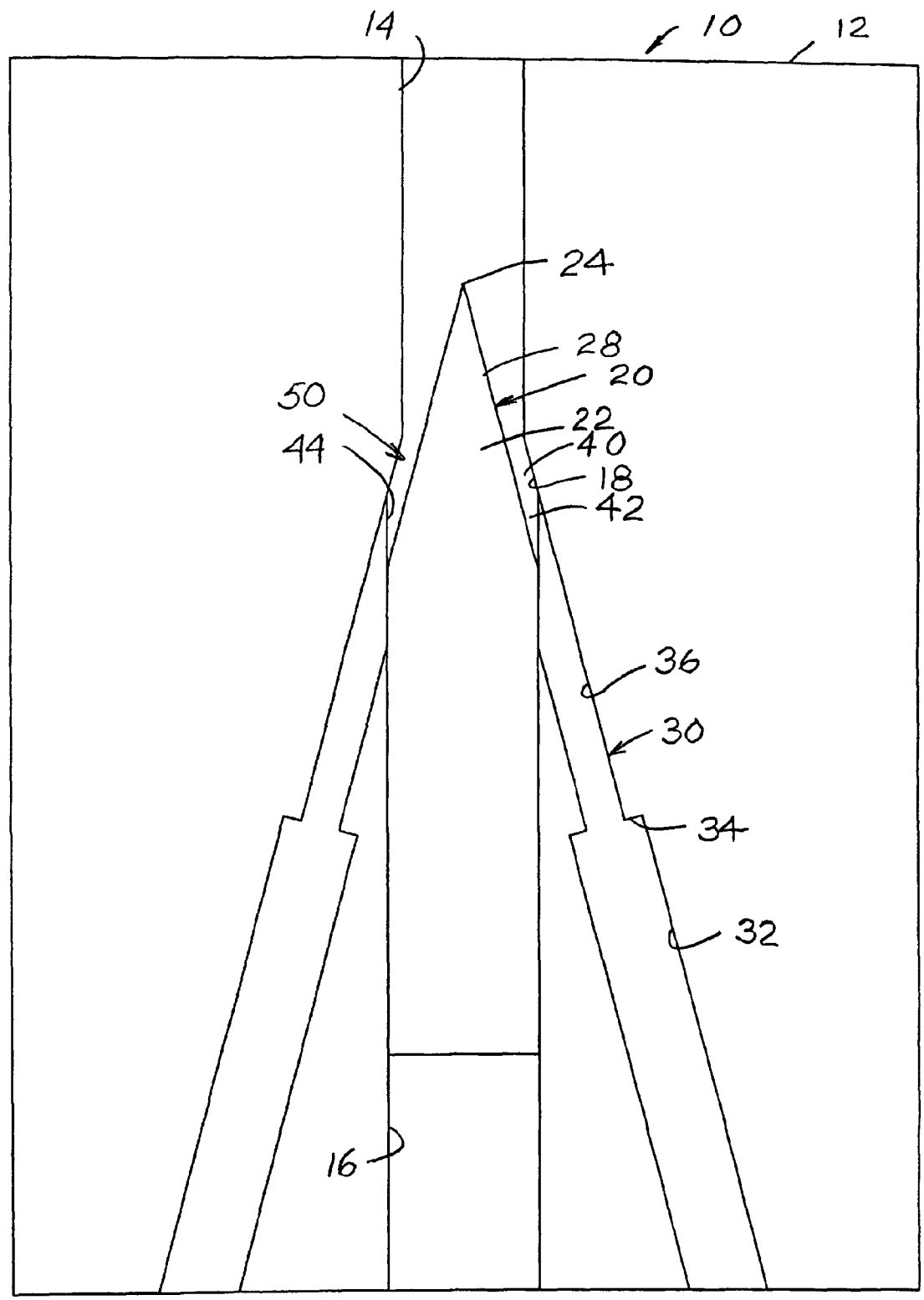
FIG. 1 is a cross sectional view of the new variable volume distributor, regulator and suction valve partially closed for flow regulation.

FIG. 1 is a cross sectional view of the new variable volume distributor, regulator and suction valve 10 partially closed 50 for flow regulation. The valve 10 has a body 12 with a central flow channel 14.

A needle assembly 20 with a body 22 and a point 24 regulates the flow through channel 14 and uniformly divides the flow to the number of multiple smaller channels 30. The needle assembly freely slides in a cylindrical receiver 16 in the body 12 and is moved precisely by a stepper motor. The stepper motor controls movement of the needle assembly 20 in less than thousandths of an inch steps.

The body 12 has a frustoconical needle seat 18 which tightly seals the complementary sloping conical wall 28 of the needle 20. The side walls 42 of the needle chamber 40 have chamfered elliptical opening ports 44 leading to the smaller channels 30. The smaller channels 30 have enlarged diameter capillary tube receivers 32 with shoulders 34 for stopping and abutting ends of the capillary tubes. The bores 36 of the smaller channels 30 exactly match the lumens in the capillary tubes for unimpeded fluid flow. In FIG. 1 the needle assembly 20 is shown in a selected middle position 50 for regulating and metering flow.

Figure 2:
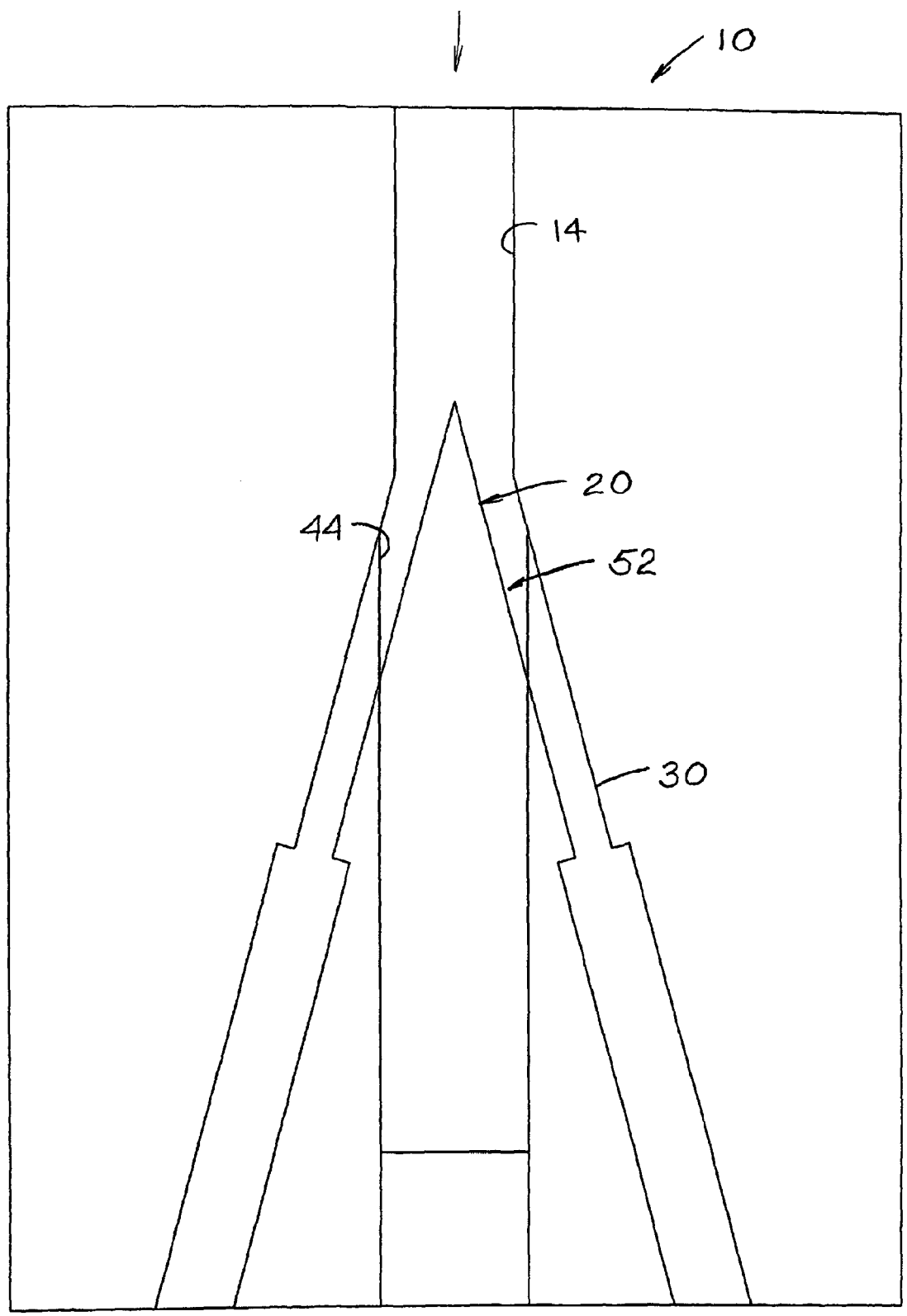
FIG. 2 is a cross sectional view of the new variable volume distributor, regulator and suction valve fully open for maximum flow to or from the distribution tubes.

FIG. 2 is a cross sectional view of the new variable volume distributor, regulator and suction valve 10 fully open for maximum flow to or from the distribution tubes. The needle assembly 20 is shown in its full retracted position 52 for providing full opening of the ports 44 to the smaller channels 30. Fully open ports 44 allow full flow through the central flow channel 14 and through the smaller channels 30.

Figure 3:
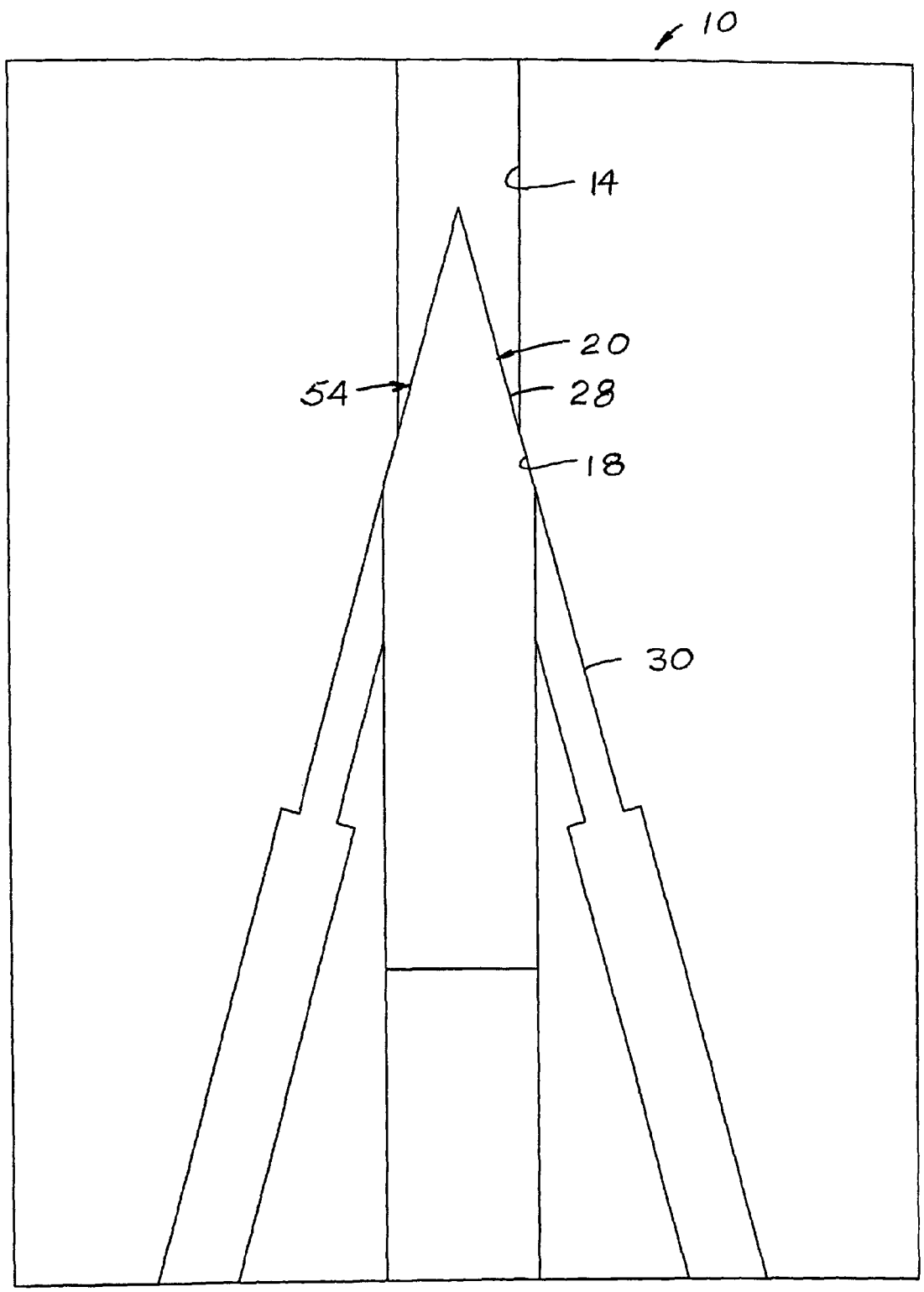
FIG. 3 is a cross sectional view of the new variable volume distributor, regulator and suction valve fully closed for stopping flow.

FIG. 3 is a cross sectional view of the new variable volume distributor, regulator and suction valve 10 fully closed 54 for stopping flow. The needle assembly 20 is shown fully advanced, with its sloping conical wall 28 tightly engaging the complementary frustoconical needle seat 18 and preventing flow through the channels 14 and 30.

The present invention provides an all-in-one expansion and distribution device 10 for metering liquid heat transfer fluid into a multiple tube evaporator. The new distributor and metering valve usually in a full open position 52 may be used to distribute hot vapor from a compressor to a multiple tube condenser.

A similar valve 10 in a reversed position may be used to collect cooled liquid from a condenser.

A similar all-in-one metering and distribution valve may 10 in a reversed position be used to collect vapor from the parallel evaporator tubes. The needle may be positioned 50 by the stepper motor to control pressure in the evaporator.

The new all-in-one distributor metering expansion valve may be used in any position with flow upward, downward, horizontal or angles in between.

The size and shape of the needle and dimensions of the channels and chambers may be precisely controlled.

From two to three or up to forty or more smaller channels may be controlled by a single needle valve. The smaller chambers may have splitters for directing flow to more than one capillary tube. Each capillary tube may have splitters for directing flow to more than one capillary tube. Internal pressures within the system may be up to 450 psi or more and up to 1200 psi for carbon dioxide refrigeration systems.

The body may be made of copper or brass, aluminum or stainless steel. The capillary tubes may be of similar material coated with flux for brazing or secured with advanced adhesives.

There is no expansion valve up stream. The new all in one variable volume expansion valve and distributor receives liquid refrigerant. Expansion takes place immediately, and the distributor distributes vapor and liquid to the ports 44, smaller channels 30 and capillary tubes. The capillary tubes deliver the vapor to the parallel microchannel tubes in the evaporator.

Figure 4:
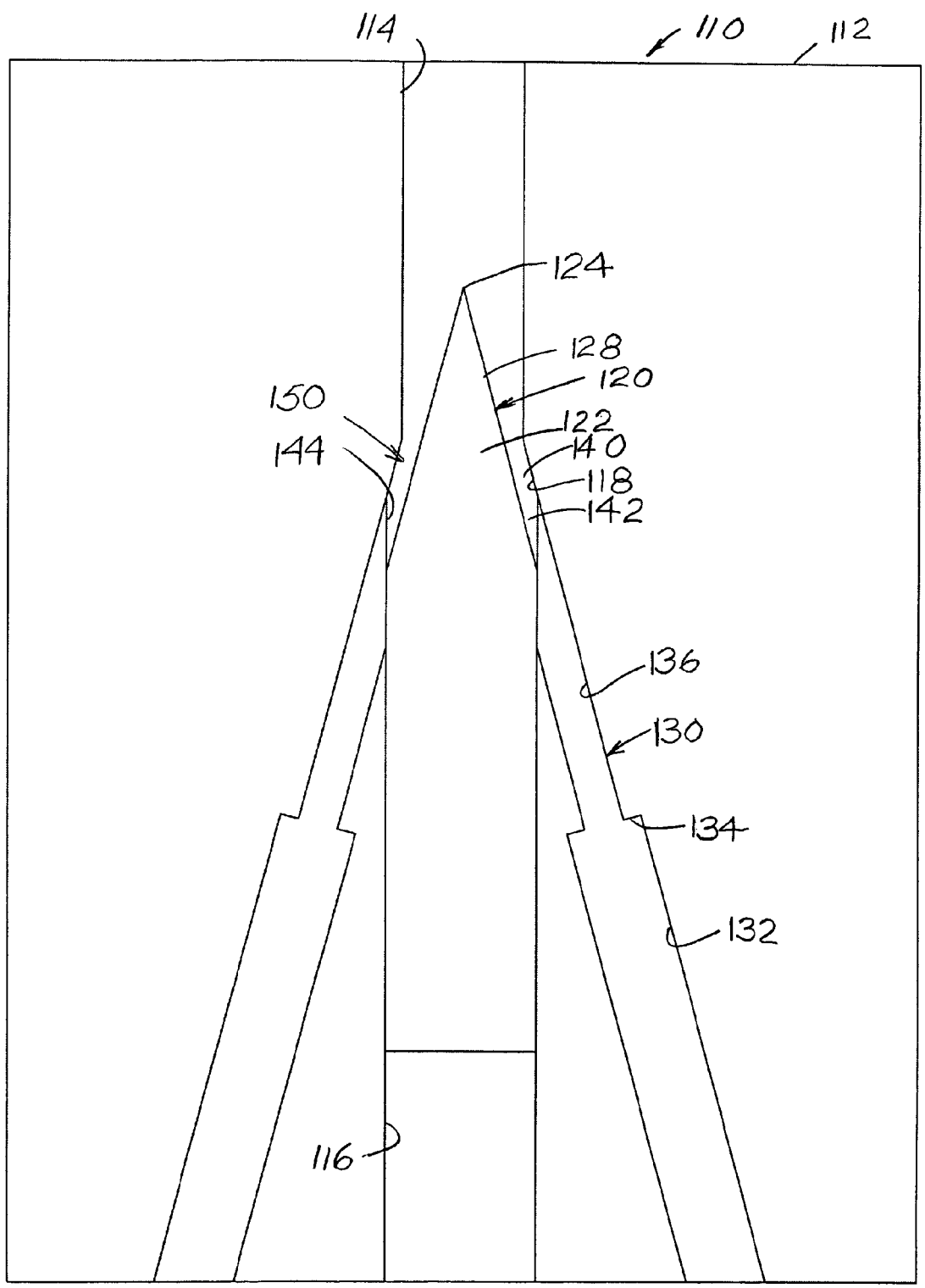
FIG. 4 is a cross sectional view of the new variable volume distributor, regulator and suction valve partially closed for flow regulation.

FIG. 4 is a cross sectional view of the new variable volume distributor, regulator and suction valve 110 partially closed 150 for flow regulation. The valve 110 has a body 112 with a central flow channel 114.

A needle assembly 120 with a body 122 and a point 124 regulates the flow through channel 114 and uniformly divides the flow to the number of multiple smaller channels 130. The needle assembly freely slides in a cylindrical receiver 116 in the body 112 and is moved precisely by a stepper motor. The stepper motor controls movement of the needle assembly 120 in less than thousandths of an inch steps.

The body 112 has a frustoconical needle seat 118 which tightly seals the complementary sloping conical wall 128 of the needle 120. The side walls 142 of the needle chamber 40 have chamfered elliptical opening ports 144 leading to the smaller channels 130. The smaller channels 30 have enlarged diameter capillary tube receivers 132 with shoulders 134 for stopping and abutting ends of the capillary tubes. The bores 136 of the smaller channels 130 exactly match the lumens in the capillary tubes for unimpeded fluid flow. In FIG. 4, the needle assembly 120 is shown in a selected middle position 150 for regulating and metering flow.

Figure 5:
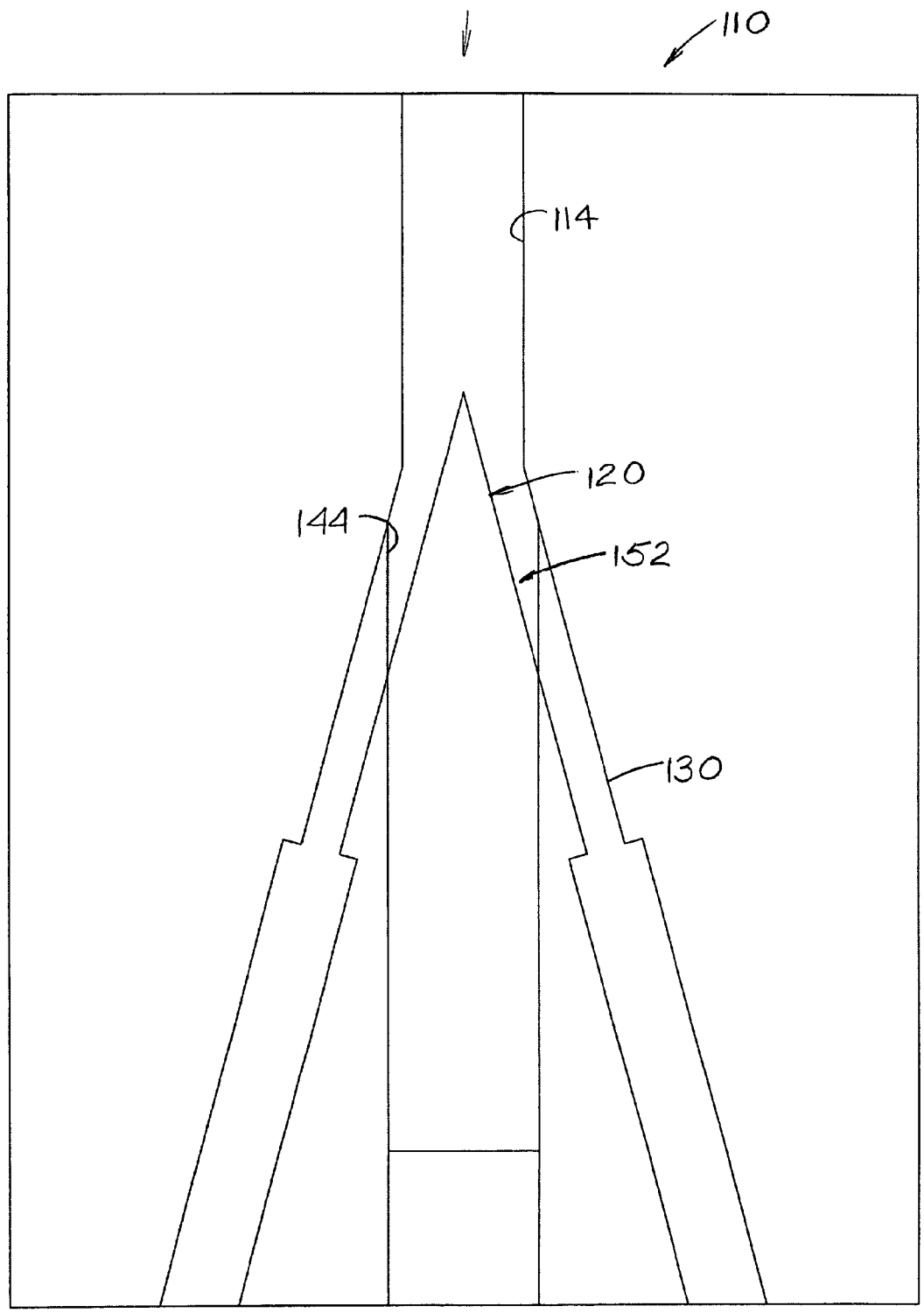
FIG. 5 is a cross sectional view of the new variable volume distributor, regulator and suction valve fully open for maximum flow to or from the distribution tubes.

FIG. 5 is a cross sectional view of the new variable volume distributor, regulator and suction valve 110 fully open for maximum flow to or from the distribution tubes. The needle assembly 120 is shown in its full retracted position 152 for providing full opening of the ports 144 to the smaller channels 130. Fully open ports 144 allow full flow through the central flow channel 114 and through the smaller channels 130.

Figure 6:
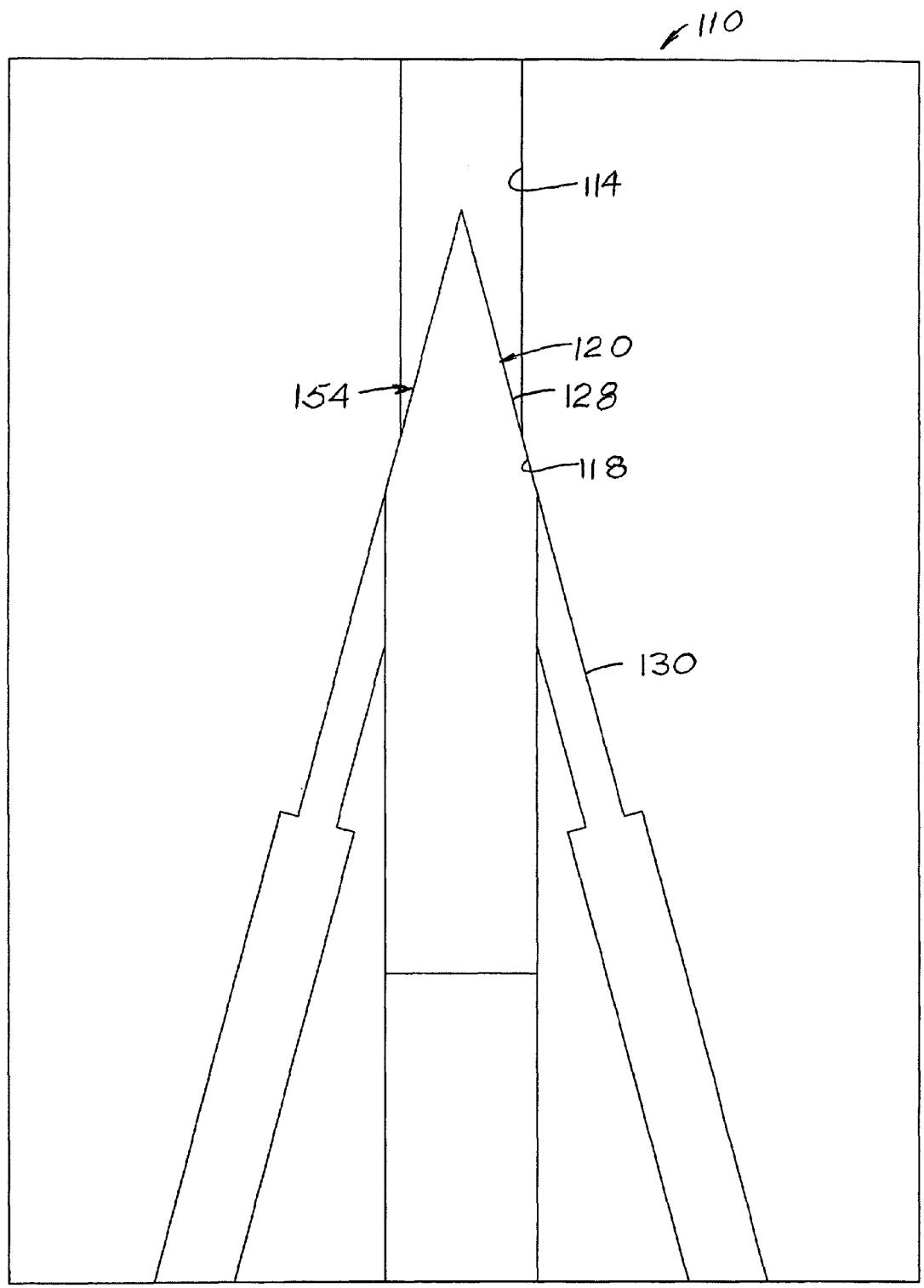
FIG. 6 is a cross sectional view of the new variable volume distributor, regulator and suction valve fully closed for stopping flow.

FIG. 6 is a cross sectional view of the new variable volume distributor, regulator and suction valve 110 fully closed 154 for stopping flow. The needle assembly 120 is shown fully advanced, with its sloping conical wall 128 tightly engaging the complementary frustoconical needle seat 118 and preventing flow through the channels 114 and 130.

The present invention provides an all-in-one expansion and distribution device 110 for metering liquid heat transfer fluid into a multiple tube evaporator. The new distributor and metering valve usually in a full open position 152 may be used to distribute hot vapor from a compressor to a multiple tube condenser.

A similar valve 110 in a reversed position may be used to collect cooled liquid from a condenser.

A similar all-in-one metering and distribution valve may 110 in a reversed position be used to collect vapor from the parallel evaporator tubes. The needle may be positioned 150 by the stepper motor to control pressure in the evaporator.

The new all-in-one distributor metering expansion valve may be used in any position with flow upward, downward, horizontal or angles in between.

The size and shape of the needle and dimensions of the channels and chambers may be precisely controlled.

From two to three or up to forty or more smaller channels may be controlled by a single needle valve. The smaller chambers may have splitters for directing flow to more than one capillary tube. Each capillary tube may have splitters for directing flow to more than one capillary tube. Internal pressures within the system may be up to 450 psi or more and up to 1200 psi for carbon dioxide refrigeration systems.

The body may be made of copper or brass, aluminum or stainless steel. The capillary tubes may be of similar material coated with flux for brazing or secured with advanced adhesives.

There is no expansion valve upstream. The new all in one variable volume expansion valve and distributor receives liquid refrigerant. Expansion takes place immediately, and the distributor distributes vapor and liquid to the ports 144, smaller channels 130 and capillary tubes. The capillary tubes deliver the vapor to the parallel microchannel tubes in the evaporator.

Figure 7:
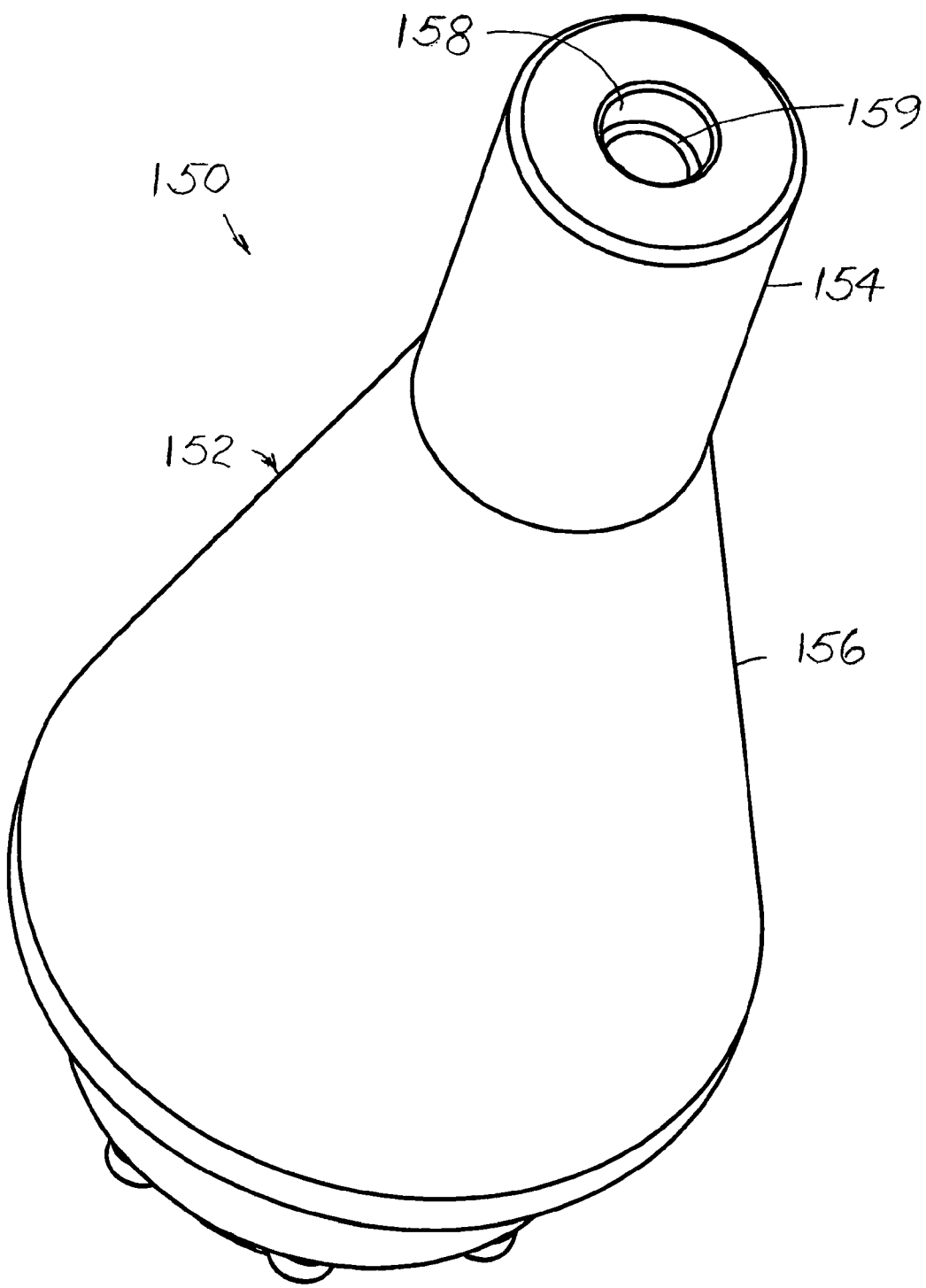
FIG. 7 is a perspective view of the expansion valve and distributor taken from the side and top.

FIG. 7 is a perspective view of the expansion valve and distributor taken from the side and top. One form of the combined expansion valve and distributor 150 has a body 152 with a cylindrical section 154 and a conical section 156. An outer end of the cylindrical section has a receiver 158 with an inner shoulder 159 for receiving a heat transfer fluid refrigerant line, which is permanently fixed in the receiver 158 by brazing or with a permanent bonding material.

Figure 8:
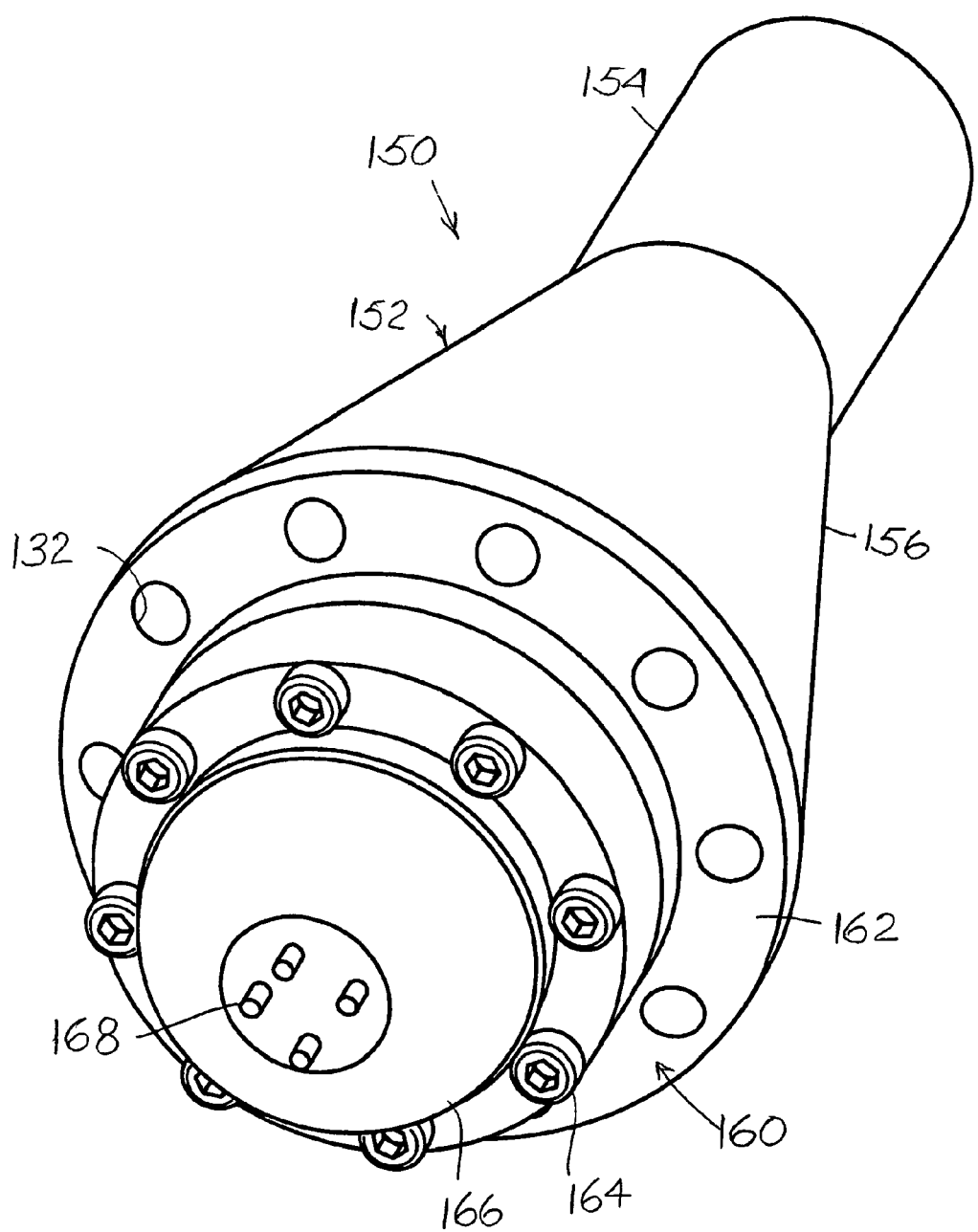
FIG. 8 is a perspective view of the expansion valve and distributor taken from the side and bottom.

FIG. 8 is a perspective view of the expansion valve and distributor 150 taken from the side and bottom. Base 160 of body 152 has an outer area 162 with from three to forty or more distribution tube receivers 132. Bolts 164 hold a hermetically sealed cover 166 over a motor housing. Electric connections 168 or insulted wire holder 168 in cover 166 provide connections to a stepper motor. The body 152 is made of copper, bronze, aluminum, steel or a rugged alternative material including or covered by an insulting material. Internal tubes may be made of copper, bronze or aluminum or other material suitable for pressurized refrigerant and temperature ranges that may widely vary. Bolts 164 and hermetically sealed cover 166 may be made of any suitable materials.

Figure 9:
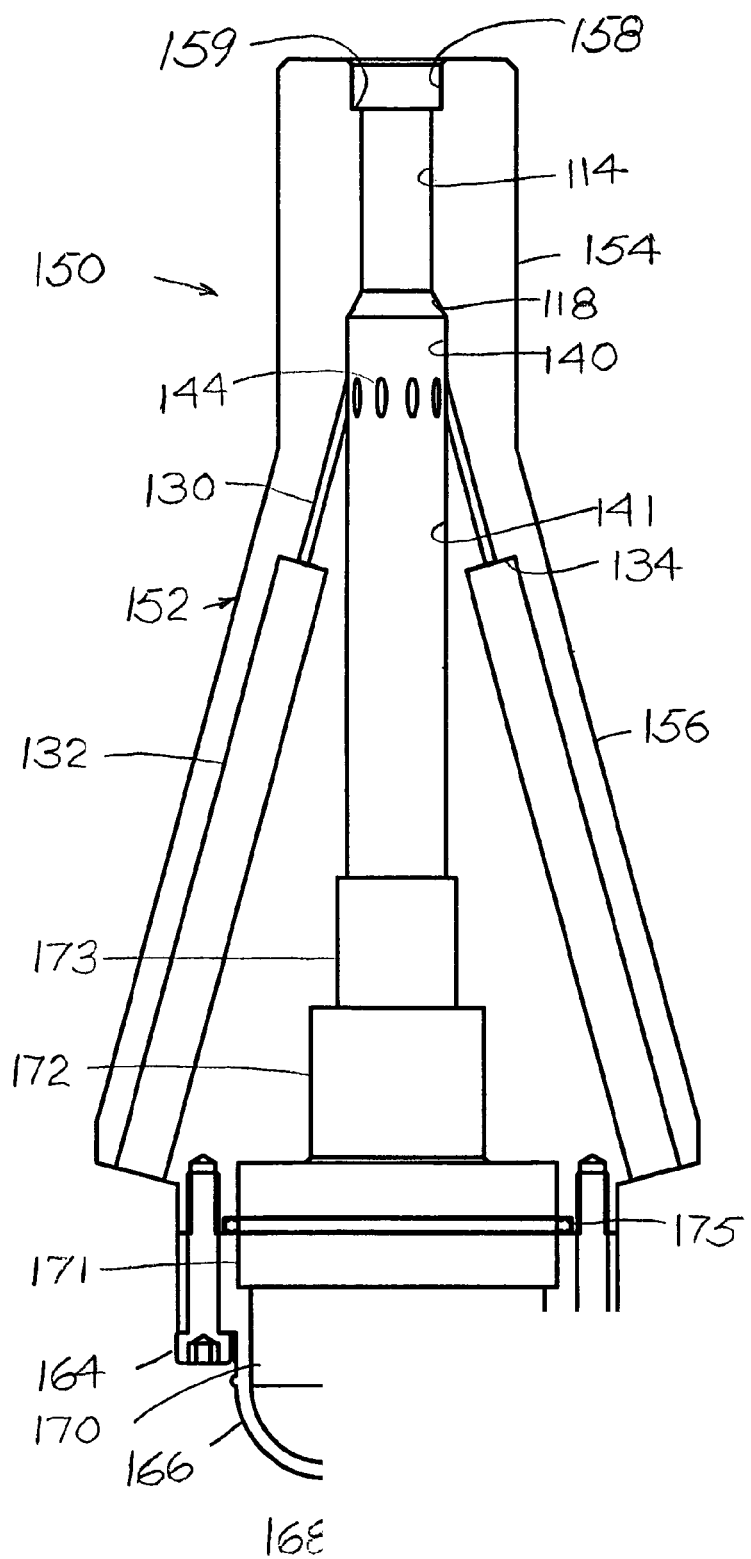
FIG. 9 is a cross section of the expansion valve and distributor.

FIG. 9 is a cross section of the expansion valve and distributor 150. The cross section shows the cylindrical section 154 of body 152 with an inlet channel 114. Channel 114 terminates outwardly in a receiver 158 with a shoulder 159 for receiving and abutting a refrigerant line. Channel 114 terminates inwardly in the expanding sloping wall that is the needle seat 118. A number of elliptical ports 144 open from the needle chamber 140 into multiple channels 130. The channels 130 lead to capillary tube receivers 134. Shoulders 146 of receivers 134 abut ends of the capillary tubes which are permanently fixed in receivers 132, such as by brazing or state of the art adhesives.

The needle chamber 140 has a bearing surface 141 in which needle 120 slides to selectively open and close the ports 144 in closely controlled increments or to shut off communication between the ports 144 and the inlet channel 114 when the needle 120 is fully closed against seat 118.

The hermetically sealed chambers 170, 171, 172 and 173 receive the stepper motor, reduction gears, a worm gear and a screw which move the needle in fine adjustment. Seal 175 hermetically seals the cover 166 to the body 152.

Figure 10:
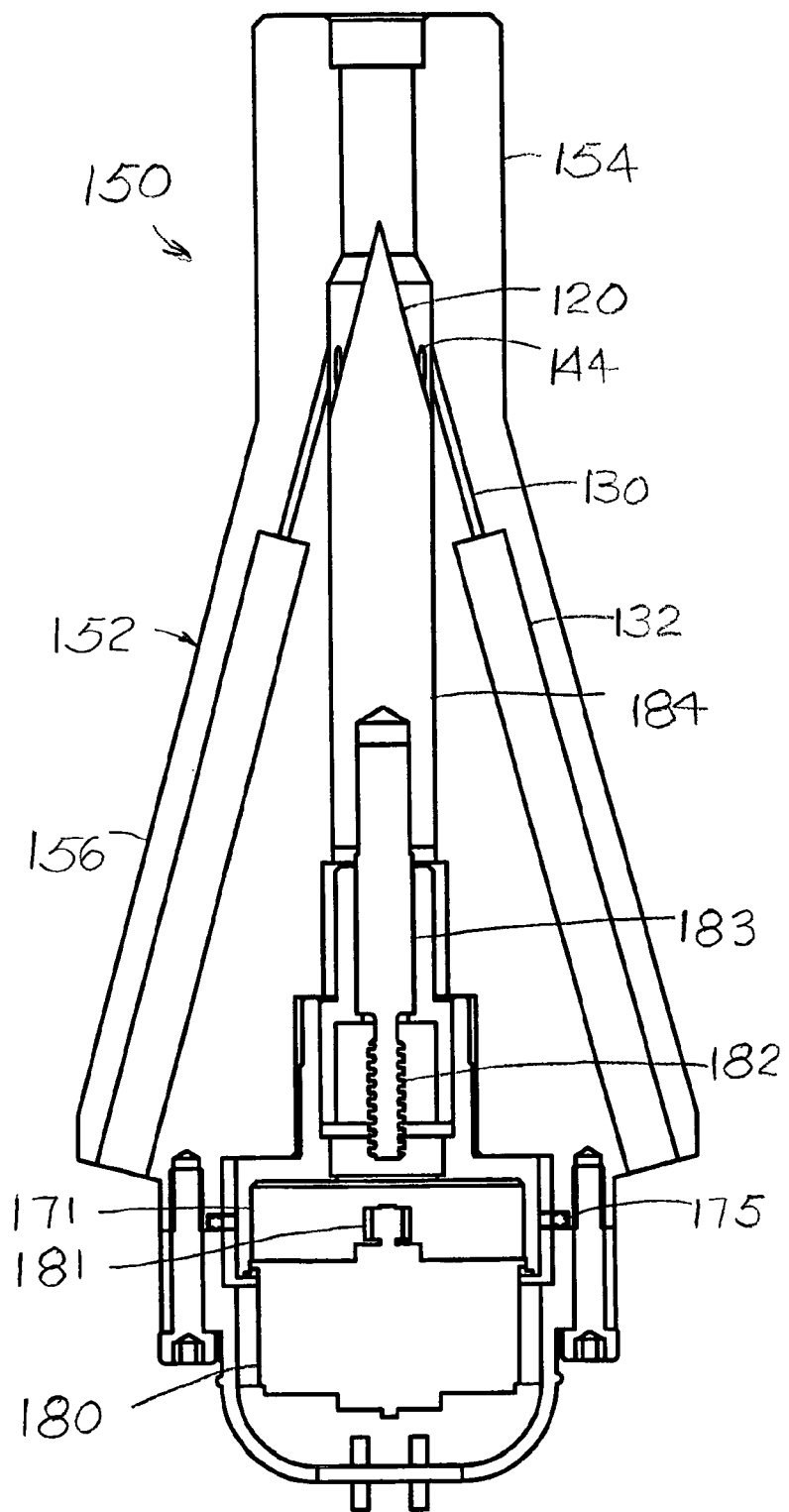
FIG. 10 is a cross section of the expansion valve and distributor with a stepper motor needle and drive.

FIG. 10 is a cross section of the expansion valve and distributor 150 with a stepper motor 180, needle 120 and drive. A stepper motor 180 mounted in chamber 170 has an attached pinion 181 that drives reduction gears (not shown) mounted in chamber 171. A worm gear mounted in chamber 172 moves a screw 182 connected to a shaft 183 fixed in extension 184 of the needle 120. Chambers 172 and 173 holds a bearing 185.

Figure 11:
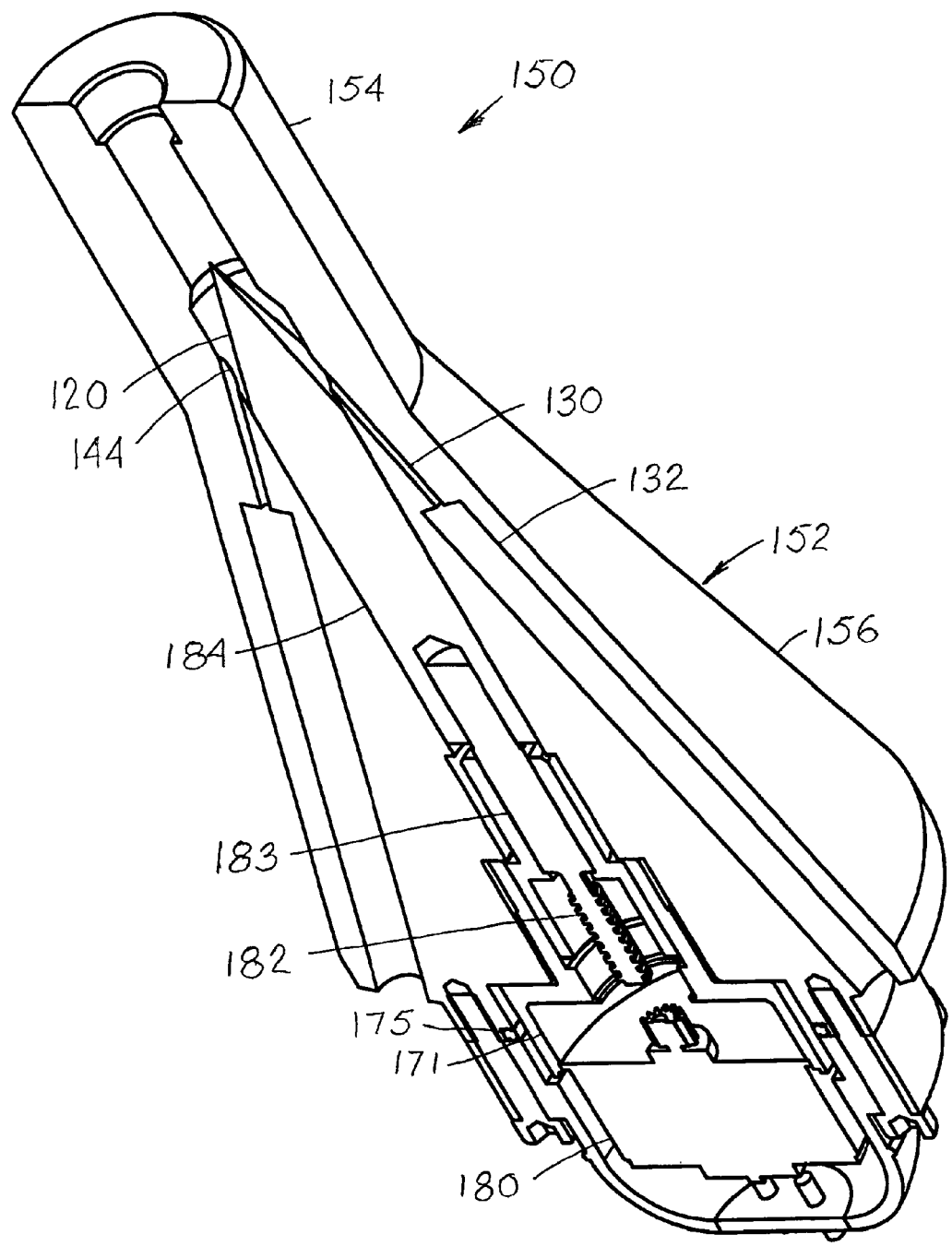
FIGS. 11 and 12 are cross sectional perspective views of the expansion valve and distributor with the sliding needle, drive connection and a stepper motor.
Figure 12:
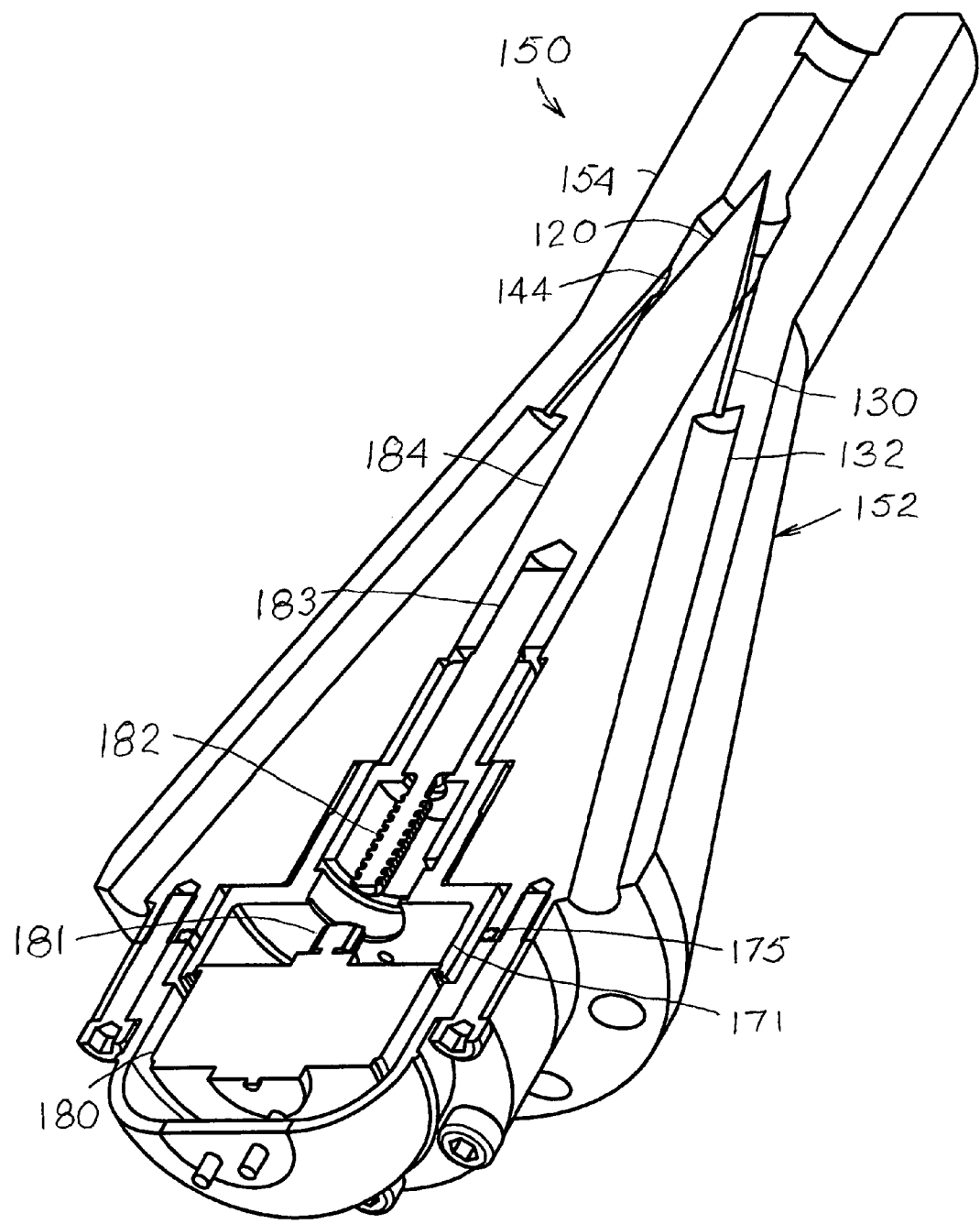

FIGS. 11 and 12 are cross sectional perspective views of the expansion valve and distributor 150 with the sliding needle 120, drive connections and a stepper motor 180. Elements of the stepper motor 180 and attached pinion 181, the seal 175 and cover 166 and the needle moving assembly are shown. The needle 120 is in a fully open position. In actual use the needle 120 is advanced to precisely control openings of ports 144.

Similarly combined valves and distributors 150 may be used on inlet and outlet ends of evaporators. In the outlet end of an evaporator, spent expanded fluid moves through the capillary tubes in the receivers 132, through the ports 144 and needle 20 chamber 140, past the needle and out through channel 114 and the refrigerant line connected in receiver 158. The stepper motor 180 precisely controls the needle 120 in the outlet valve 150 to control pressure in and flow through the evaporator refrigerant tubes.

In the exit of the evaporators and condensers the combined valves and distributors 150 may function as combined valves and fluid combiners.

Similar combined valves and distributors 150 may be used in inlets and outlets of condensers, except that ports 144 remain open for unrestricted through flow to cool the compressed vapor from the compressor into a liquid in the condenser.

Figure 13:
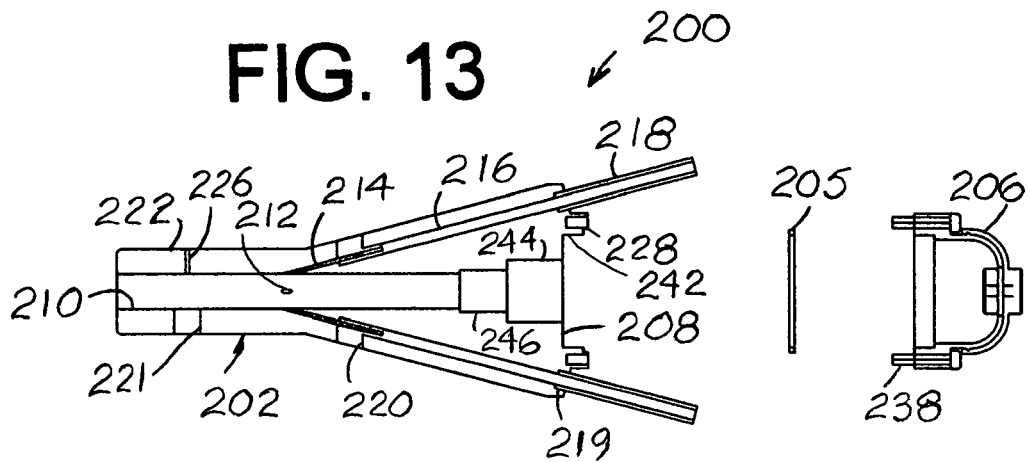
FIG. 13 is a cross section of a refrigerant control valve body, stepper motor, cover and seal.

FIG. 13 shows an expansion valve 200, body 202 and cover 206 with a sealing gasket 205. Body 202 may be made of aluminum, brass or stainless steel or any suitable material. The body 202 has a through bore 210 with side opening ports 212 leading to from three to forty or more tubes 214. Tubes 214 open into channels 216, which extend through connectors 218 that extend from a large end 208 of the body. Connectors 218 are thin tubes having proximal ends permanently fixed in receivers 219 in the large end 208 of the valve body 202. The connectors 218 conduct refrigerant between the channels 216 and microtubes and coils in the attached heat exchanger.

The channels 216 open laterally in an annular chamber 220 for bypass. A cylindrical portion 222 of the body 202 has an opening 221 at one side for a bypass connection and has a small opposite hole 226 for receiving a slide travel limiting pin.

Threaded holes 228 in end 208 receive bolts 238 extending from cover 206 for engaging the cover 206 in a hermetic seal, using interposed gasket 205, with end 208 of body 202. The through bore 210 has recesses 242, 244 and 246 for receiving respectively a stepper motor, a reduction gear assembly, a needle drive and a bearing as shown in FIG. 2.

Figure 14:
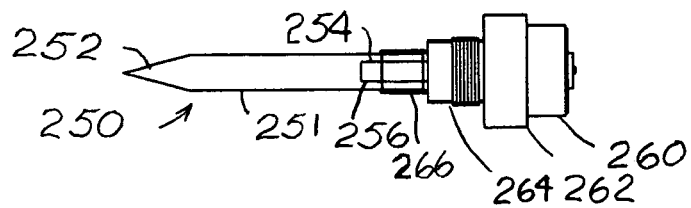
FIG. 14 is an elevation of a needle assembly with a stepper motor, reduction gear case, needle, needle shaft and reciprocating drive.

FIG. 14 is an assembled view of a needle assembly 250 for fitting in the through bore 210 and recesses 242, 244 and 246 of the valve body 202 shown in FIG. 1.

The needle assembly 250 has a needle shaft 251 with an end needle 252 and a recess 254 of the opposite end for receiving a threaded shaft 256. The threaded shaft is moved axially by the stepper motor 260, reduction gear assembly 262 and needle drive connection 264. The sliding bearing 266 fits in recess 246 to control the movement of needle shaft and needle into positions precisely controlled by the stepper motor and reduction gear.

Figure 15:
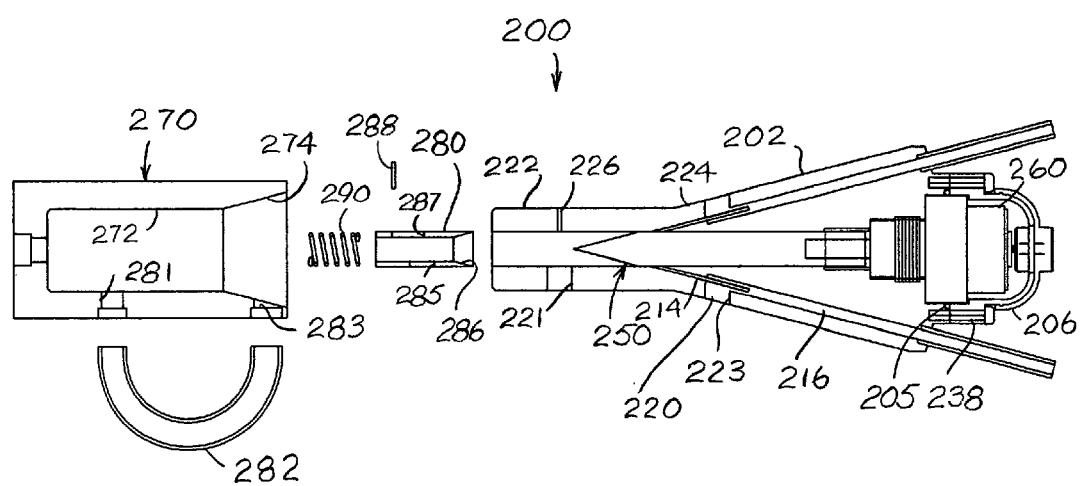
FIG. 15 is an exploded view of the needle assembly, refrigerant control valve body, bypass housing, spring and slide in partially cross section.
Figure 16:
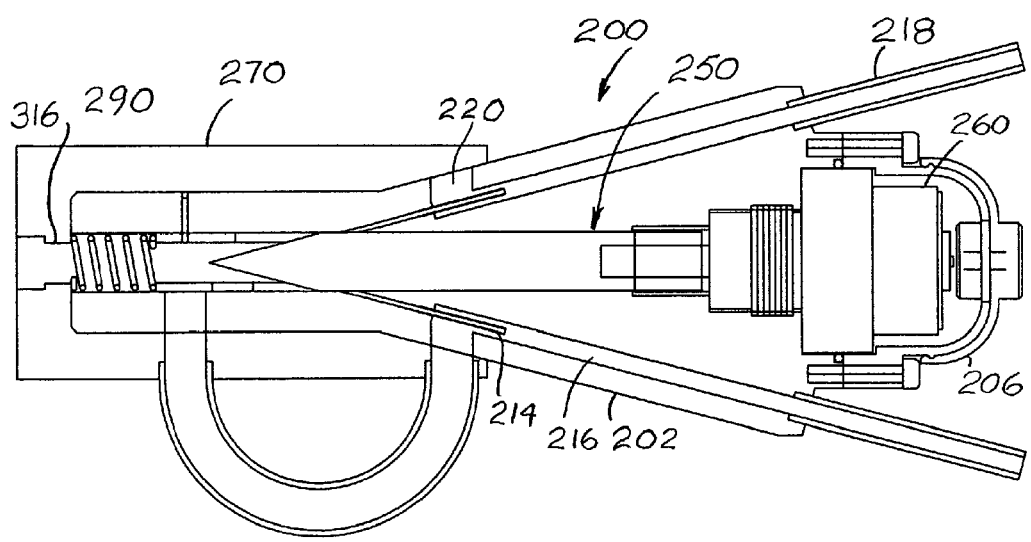
FIG. 16 is an assembled view of the needle assembly, refrigerant control valve body, bypass housing, spring and slide partially in cross section.

FIG. 15 is an exploded view of the needle assembly refrigerant control valve body, bypass housing, spring and slide in cross section. As shown in FIG. 4, the needle assembly 250 is inserted in the valve body 202. The cover 206 is secured over the stepper motor 260 by bolts 238, forming a hermetic seal by compressing seal 205 in a recess.

A bypass cover 270 fits over the cylindrical portion 222 of valve body 202. The bypass cover 270 has a cylindrical chamber 272 for receiving the cylindrical end 222 of body 202. The cylindrical chamber has a frustoconical enlarged recess 274 for fitting over the conical portion 224 of valve body 202 that integrally extends from the cylindrical portion.

The bypass cover 270 has bypass ports 281, 283 which are aligned with bypass ports 221, 223 in valve body 102.

Cylindrical slide 280 has a port 285 which aligns with port 281 when slide 280 is pushed against force of compression spring 290 into a position for alignment of port 285 with ports 221 and 281. Slide 280 has a funnel shaped end 286 which is sloped to receive the sloped wall 253 of the needle 252.

Slide 280 has an elongated opening 287 opposite port 285 which receives an extended end of pin 288 which is fixed in hole 226 radially extending through the cylindrical end 222. The inward extending end of pin 288 limits movement of slide 280 to two positions. The furthest left position aligns port 285 with ports 221 and 281. The furthest right position of cylindrical slide 280 moves port 285 away from alignment with port 281 and shuts the bypass port, preventing bypass.

Port 283 is always aligned with port 223 in valve body 202. Port 223 has a cylindrical circumferential chamber 220 which connects with channels 216 in the valve body 202.

Ports 283 and 223 are always ready for bypass when slide 280 is moved into the bypass position. A bypass channel 282 is connected between ports 281 and 283 to bypass the needle valve.

FIGS. 17-20 are similar views of a liquid refrigerant control valve, respectively showing the needle shaft, needle and slide in bypass, shut off, suction pressure regulating and fully open positions. In bypass positions 311 of refrigerant control valve 200 as shown in FIG. 5 the stepper motor 260 and gears 262 and drive connection 264 advance the needle shaft 251 and needle to the fully extended bypass position 311. Sides 253 of the needle 252 have pushed slide 280 to its full bypass position 311, with spring 290 compressed. Refrigerant control fluid flows directly between port 316 at the end of bypass cover 270 and channels 216 in the valve body 202, via chamber 220 and bypass 282.

Figure 18:
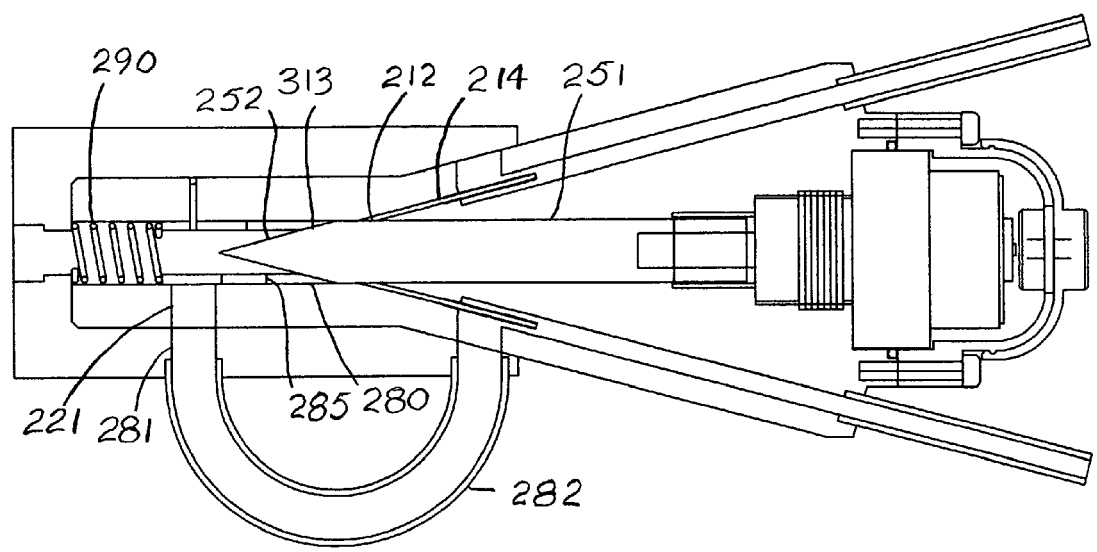

FIG. 18 shows a shut off position 313 of refrigerant control valve and distributor 200, in which needle 252 and shaft 251 have been retracted, allowing spring 290 to move slide 280 so that ports 285 and 281 are not aligned, shutting off the bypass 282. The needle shaft 251 is sufficiently advanced so that ports 212 and tubes 214 are closed. The entire valve 200 is shut off.

Figure 19:
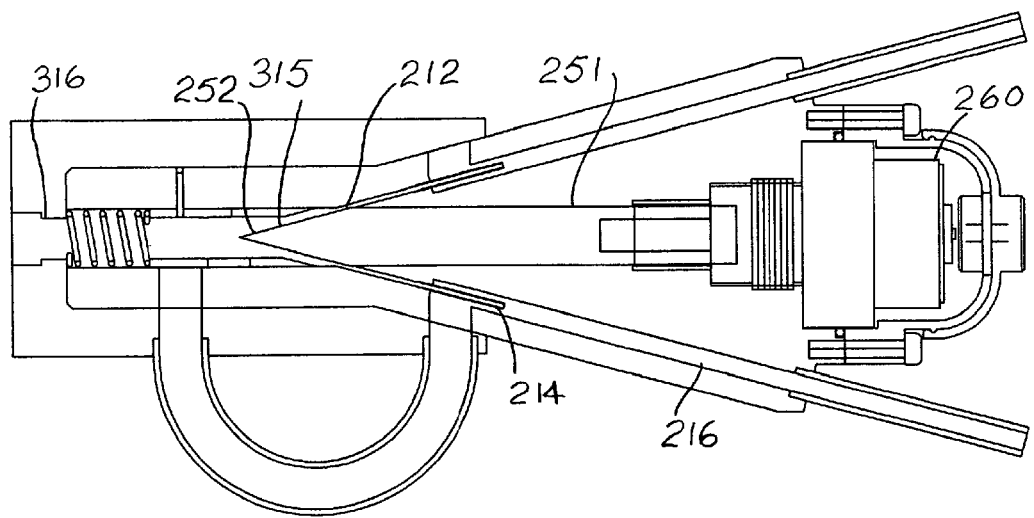

FIG. 19 shows a position 315 in which the needle shaft 251 and needle 252 have been moved into a position by the stepper motor 260 to partially open the ports 212 at the end of tubes 214. Liquid refrigerant flows into port 316, strikes the needle 252 and deflects into the partially opened ports 212 and through the tubes 214 and channels 216 into microchannels and coils in a heat exchanger.

Figure 20:
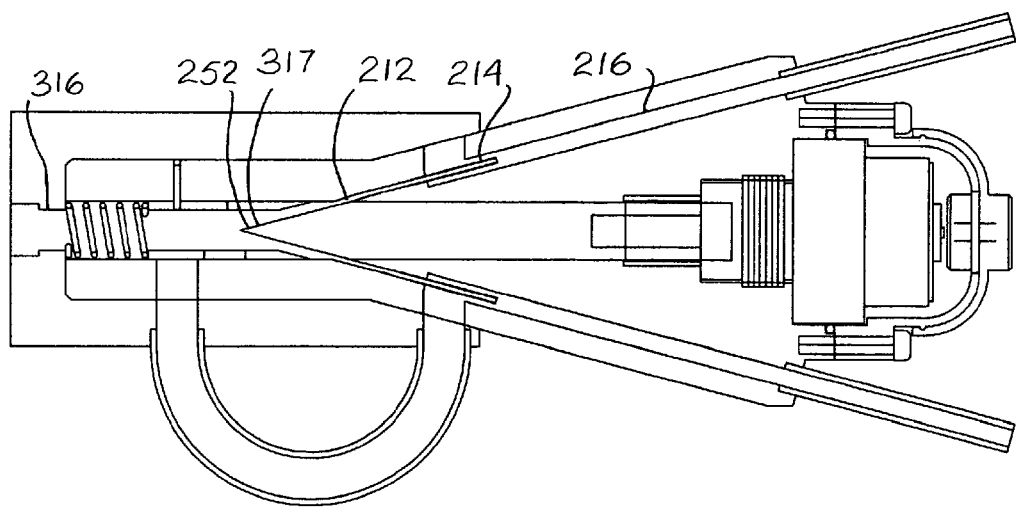

FIG. 20 shows a position 317 in which the needle shaft and needle are fully retracted to fully open ports 212 and tubes 214 leading to channels 216 and to microtubes and coils in a heat exchanger. Liquid refrigerant flows into port 316, strikes the needle 252 and is deflected into the partially opened ports 212 and through the tubes 214 and channels 216 into microchannel tubes and coils in a heat exchanger. FIG. 8 shows a position 317 in which the needle shaft and needle are fully retracted to fully open ports 212 and tubes 214 leading to channels 216 and to microtubes and coils in a heat exchanger. Liquid refrigerant under high pressure strikes the point of needle 252 and deflects to ports 212 and tubes 214.

Figure 21:
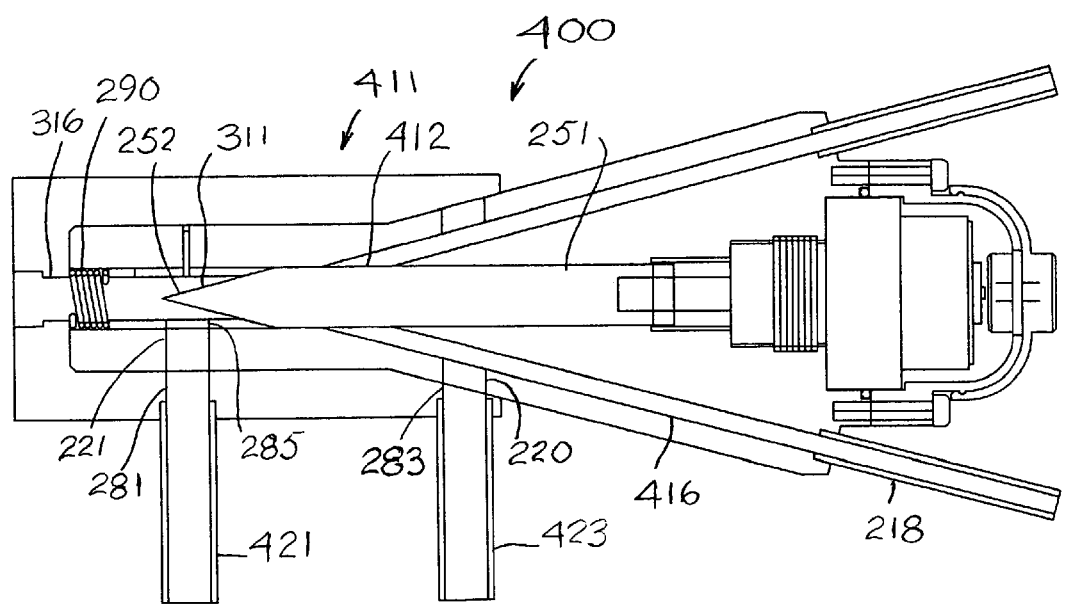
FIGS. 21-24 are similar views of a vapor refrigerant control valve showing the needle and slide in bypass, shut off, suction pressure regulating and fully open positions.

FIGS. 21-24 are similar views of a vapor refrigerant control valve showing the needle shaft, needle and slide respectively in bypass, shut off, suction pressure regulating and fully open positions. FIG. 21 shows a valve 400 similar to valve 200, except for the elimination of tubes 214, the enlargement of ports 412 and the inward extension of the channel 416 to the enlarged ports 412.

Figure 17:
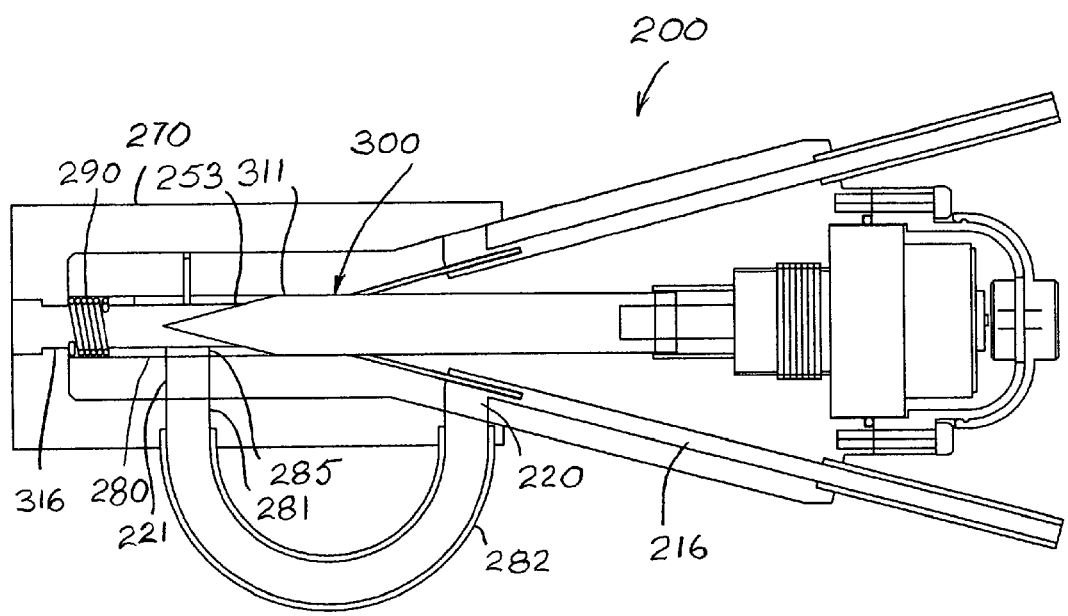
FIGS. 17-20 are similar views of a liquid refrigerant control valve respectively showing the needle and slide in bypass, shut off, pressure regulating and fully open positions.

In FIG. 21, which is similar to FIG. 17, the needle shaft 251 and needle 252 are fully extended to push cylindrical slide to a position 311 in which port 285 aligns with ports 221 and 281 to place the valve 400 in bypass position 411.

Bypass ports 281 and 283 are connected to tubes 421 and 423 which conduit the bypass fluid to another device, such as an evaporator drain pan heater coil.

Figure 22:
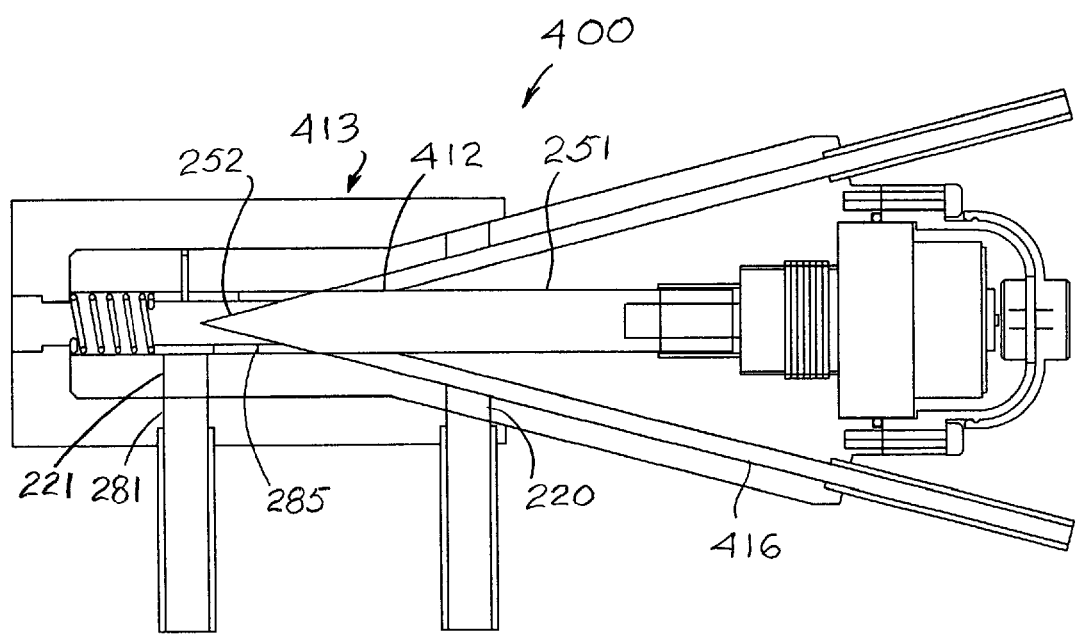

FIG. 22 is similar to FIG. 18. Vapor refrigerant control valve 400 is placed in full shut off condition 413. Needle 252 and needle shaft 251 are positioned to allow slide 280 to misalign ports 385 and 281, shutting off the bypass port 281. The needle shaft 251 shuts off ports 412 and channels 416.

Figure 23:
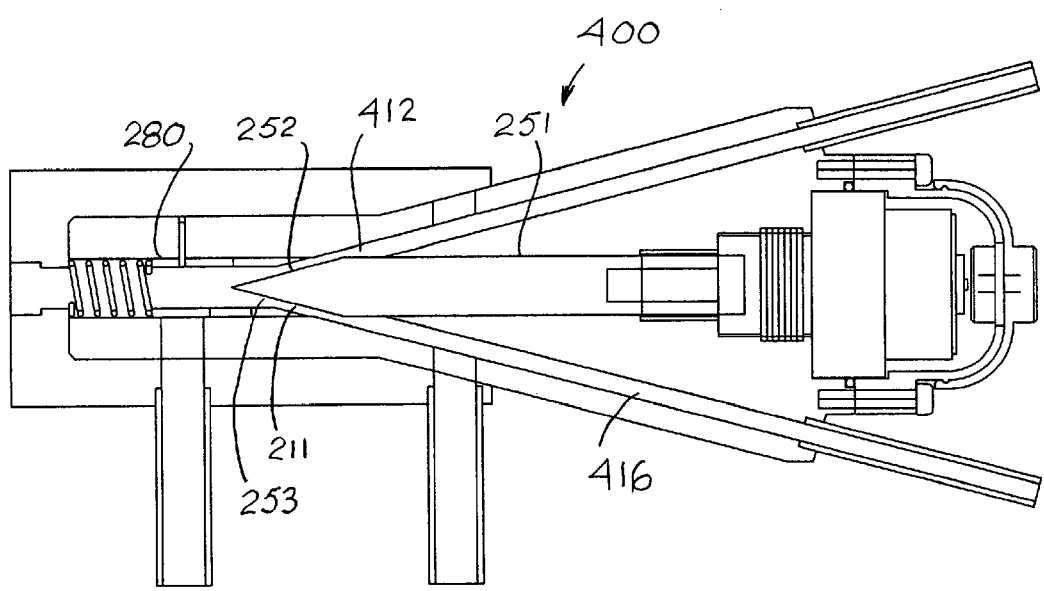

FIG. 23 is similar to FIG. 19, except that the ports 412 are enlarged and channels 416 are extended to the larger ports. Valve 400 is used primarily for vapor, such as controlling release of spent cool vapor from an evaporator and thus controlling compressor suction pressure by controlling evaporator pressure. In FIG. 11 the needle 252 and needle shaft 251 are positioned to partially open ports 412, and to control evaporator pressure and thereby suction pressure. The sloped end of slide 280 and the sides 253 of the needle 252 form a smooth annular channel 211 leading to or from the ports 412.

Figure 24:
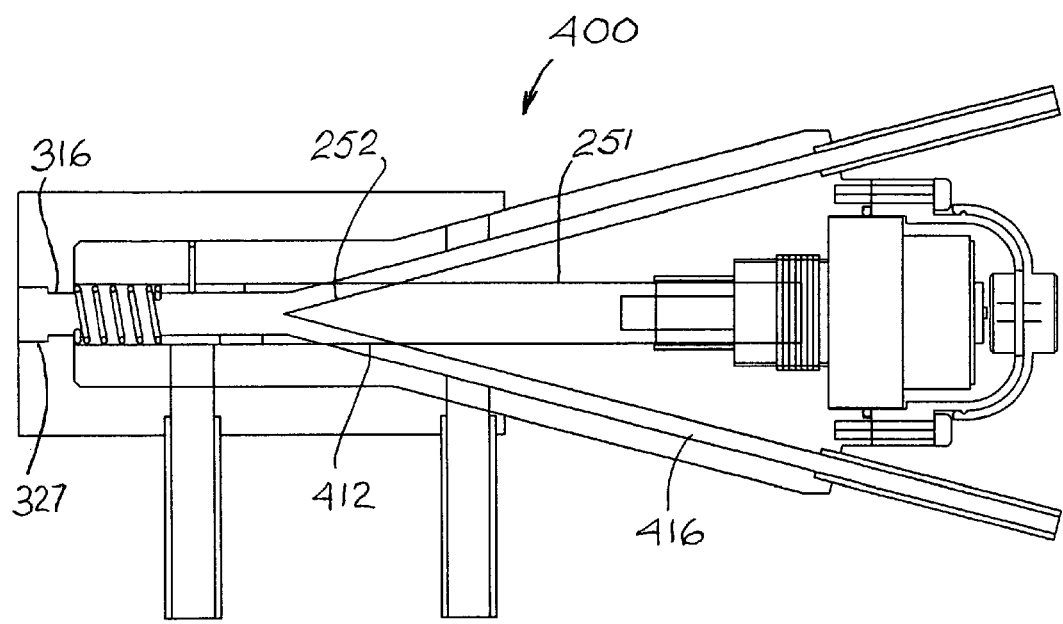

FIG. 24 shows the valve 400 fully opened by withdrawing needle 252 and needle shaft 251 so that the ports 412 are fully open, allowing vapor to freely pass through channels 416, ports 412 and end port 316.

As shown in all of FIGS. 15-24 end port 316 has a recess 327, in which an end of a refrigerant line is fixed such as by brazing or by state of the art adhesives to connect to the line to an input of a compressor for refrigeration.

Valves 200 are liquid refrigerant control valves which are intended to be connected to an input of an evaporator, or to be reversed and connected to the output of a condenser.

In the latter condenser connection, tubes 318 are connected to outlet ends of microchannel tubes in condenser coils. The needle and needle shaft are moved to fully bypass position as shown in FIG. 5. The ports 285 and 281 are aligned to let the condenser liquid refrigerant to flow through tubes 218 channels 216, through bypass 282, ports 281 and 285 and out through port 236.

The bypass is closed in the valve 200 at the entrance to the evaporator. Needle 252 and shaft 251 are placed in the position 315 shown in FIG. 19 for controlling liquid refrigerant flow diversion by needle 252 and flow into ports 212, tubes 214 and expand channels 218 and connectors 218 when flowing into microchannel tubes and coils in the evaporator.

A similar valve 200 may replace an expansion valve to expand a small amount of liquid to a vapor flows to the suction accumulator to control compressor temperature.

In the refrigeration operation valve 400 is connected to the output of the evaporator. The valve 400 is placed in position 415 as shown in FIG. 23. The bypass is closed and spent expanded vapor passes through connectors 218, channels 416 and ports 412 and out through port 326 to the suction accumulator.

In the heating and defrosting mode, a reversing valve is operated. Hot compressed vapor from the compressor flows through vapor refrigerant valve 400 in bypass condition 411, as shown in FIG. 21, or in fully open condition 417, as shown in FIG. 24.

In the bypass condition hot vapor flows through ports 285 and 281 into the tube to a drain pan heater and back through port 283 into channels 416 and connectors 218 to the microchannel tubes and coils in the evaporator.

A fluid refrigerant valve 200 at the normal entrance to the evaporator is moved to bypass condition 311 as shown in FIG. 17. The vapor which has been cooled and condensed to liquid in the evaporator flow from the microchannel tubes and evaporator coils, flow through connectors 218, channels 216, annular channel 220, bypass port 283, bypass 282, port 281 and aligned port 285 out through port 316 to the condenser.

Liquid refrigerant control valve 200 at the condenser is moved to a position 315 as shown in FIG. 19. The bypass ports 385, 381 are misaligned, shutting off the bypass. Ports 212 are slightly opened by the needle 252 allowing the fluid to flow through tubes 214 into channels 216 and through connectors 218 to the microchannel tubes and coils in the condenser while expanding the liquid into vapor. The vapor is returned through the reversing valve to the compressor.

When returning the reversing valve to refrigeration, the needle in the liquid refrigerant control valve at the condenser outlet is moved to the bypass position 311 as shown in FIG. 17, the needle in the liquid refrigerant control valve at the entrance to the evaporator is moved to metering position 315 as shown in FIG. 19, and the vapor refrigerant control valve 400 at the exit of evaporator is moved to metering position 415 shown in FIG. 23.

While the invention has been described with reference to specific embodiments, modifications and variations of the invention may be constructed without departing from the scope of the invention, which is defined in the following claims.

I claim:

1. Apparatus comprising
a refrigerant control valve having a valve body,
a bore in the valve body,
the bore having a first end portion, a medial portion and a second end portion,
the first end portion of the bore comprising a first cylinder with a first diameter,
the second end portion of the bore compressing a second cylinder with a second diameter larger than the first diameter,
the medial portion of the bore comprising
a valve seat having a frustoconical shape connecting the first and second cylinder,
plural channels extending through the valve body,
the channels having first and second ends,
plural elongated lateral openings adjacent the valve seat in the medial portion of the bore,
the first ends of the channels severally connected to the lateral openings in the medial portion of the bore,
a needle assembly mounted in the second end of the through bore, the needle assembly having a conical portion and a cylindrical portion, the conical portion having a shape and slope similar and complementary to the frustoconical shape of the valve seat,
a longitudinal needle motion controller connected to the needle assembly, and disposed with the needle assembly to move the needle in the bore and to move an end of the needle in the bore to selectively open and close the lateral openings concurrently with opening and closing the needle seat and to control fluid flowing through the first end portion of the bore and through the plural lateral openings and the plural channels.

2. The apparatus of claim 1, wherein the valve body has an axis, a first end, a second end, a first end portion, a medial portion and a second end portion, wherein the first end portion of the valve body is generally cylindrical and the medial and second end portions of the valve body are generally conical and funnel shaped and extend outward from the axis with increasing diameters of the medial and second end portions.

3. The apparatus of claim 2, wherein the plural channels are arranged at acute angles with respect to the bore and extend through the medial portion of the valve body and the second end portion of the valve body.

4. The apparatus of claim 2, further comprising a cap fitted on the second end of the valve body, a sealing ring between the cap and the second end of the valve body and fasteners connected to the cap and the second end of the valve body and compressing the sealing ring between the cap and the second end of the valve body.

5. The apparatus of claim 2, wherein the valve body has an annular surface and the surface has plural spaced connection openings at the second ends of the plural channels.

6. The apparatus of claim 5, wherein the connection openings have recesses in the second end of the valve body and wherein connection tubes are inserted and sealed in the recesses.

7. The apparatus of claim 2, further comprising a first recess in the second end of the valve body, a speed reducer positioned in the first recess, a second smaller recess in the second portion of the body, and a rotary to linear converter positioned in the first and second recesses, a stepper motor connected to the speed reducer, a cap covering the stepper motor and holding the stepper motor toward the speed reducer, a sealing ring interposed between the cap and the second end of the valve body and fasteners connecting the cap to the second end of the valve body and compressing the sealing ring.

8. The apparatus of claim 2, further comprising a large bypass hole extending through a wall of the first portion of the valve body, plural outward extending holes from first ends of the plural channels through a wall of the medial portion of the valve body, a bypass cover having a central first end opening fitted over the first portion and partially over the medial portion of the valve body and a fluid connection connected to the cover for connecting the bypass hole in the first portion of the valve body to the plural outward extending holes from the first ends of the plural channels, an annular cylindrical sleeve having open first and second ends and slideable within the through bore, the sleeve having a lateral hole for selectively aligning with the bypass hole, a sleeve travel limiter adapted to permit movement between a first position aligning the sleeve lateral hole with the bypass hole and a second position closing the bypass hole with a wall of the sleeve, a spring interposed between the first end of the cover and a first end of the sleeve urging the sleeve into its second position closing the bypass hole, wherein advancing the needle toward the first end of the through bore closes the lateral openings to the tubes and moves the sleeve against force of the spring into the first position of the sleeve, opening the bypass hole.

9. The apparatus of claim 1, wherein the medial portion of the bore is a needle chamber wherein a shaft of the needle shaft slides.

10. The apparatus of claim 9, wherein the second end of the needle is connected to a threaded shaft, and the threaded shaft is connected to a complementary threaded sleeve, and wherein the needle motion controller is connected to the complementary threaded sleeve to turn the sleeve in a first direction to advance the needle in the bore and to turn the sleeve in a second opposite direction to move the needle in an opposite direction.

11. The apparatus of claim 10, wherein the needle motion controller further comprises a stepper motor, a speed reducer connected to the stepper motor, and an output on the speed reducer connected to the sleeve to rotate the sleeve selectively in the first and second directions.

12. The apparatus of claim 10, wherein the second end of the needle has a recess that receives the threaded shaft.

13. Apparatus comprising
a refrigerant control valve having a valve body,
a bore in the valve body,
the bore having a first end portion, a medial portion and a second end portion
plural channels extending through the valve body,
the channels having first and second ends,
plural lateral openings in the medial portion of the through bore,
a valve seat in the medial portion immediately adjacent the lateral openings,
the first ends of the channels severally connected to the lateral openings in the medial portion of the through bore,
a needle assembly mounted in the second end of the bore, the needle assembly having
a needle with first and second ends,
an end needle on the first end of the needle shaft,
a recess in the second end of the needle shaft,
a threaded shaft having first and second ends,
the threaded shaft mounted in the recess in the second end of the needle shaft,
a reduction gear assembly connected to the second end of the threaded shaft,
a stepper motor connected to the reduction gear assembly and disposed with the needle assembly to move the needle shaft in the bore and to move the end needle in the through bore to selectively open and obscure the lateral openings and to control fluid flowing through the first end portion of the bore and through the plural lateral openings and the plural channels.

14. A method comprising
providing a refrigerant control valve having a valve body with a connection to a refrigerant,
providing a bore in the valve body,
providing plural channels extending through the valve body,
providing plural lateral openings from the channels in the medial portion of the bore,
providing a valve seat adjacent the openings in the medial portion,
providing a needle assembly mounted in a second end of the bore,
the needle assembly having an end needle on a first end of the needle shaft,
providing a longitudinal needle motion controller on a second end of the needle shaft,
moving the needle shaft in the bore, and selectively opening, partially closing and closing the lateral openings and controlling refrigerant fluid flowing between the first end of the bore and the plural channels.

15. The method of claim 14, wherein the moving the needle shaft comprises providing a stepper motor and a speed reducer, moving a threaded shaft with the speed reducer and moving the needle with the threaded shaft.

\* \* \* \* \*